United States Patent
Zhao et al.

(10) Patent No.: US 10,018,164 B2
(45) Date of Patent: Jul. 10, 2018

(54) GAS COMPRESSOR PRESSURE RELIEF NOISE REDUCTION

(71) Applicant: GM GLOBAL TECHNOLOGY OPERATIONS LLC, Detroit, MI (US)

(72) Inventors: Guangzhi A. Zhao, Troy, MI (US); Christopher K. Clarke, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 186 days.

(21) Appl. No.: 15/013,475

(22) Filed: Feb. 2, 2016

(65) Prior Publication Data
US 2017/0218892 A1 Aug. 3, 2017

(51) Int. Cl.
*F02B 33/40* (2006.01)
*F02B 37/16* (2006.01)
*F02M 35/12* (2006.01)

(52) U.S. Cl.
CPC ......... *F02M 35/1211* (2013.01); *F02B 33/40* (2013.01); *F02B 37/16* (2013.01)

(58) Field of Classification Search
CPC ..... F02B 33/40; F02B 37/16; F02M 35/1211; Y02T 10/144
See application file for complete search history.

(56) References Cited

U.S. PATENT DOCUMENTS

| 5,295,785 A * | 3/1994 | Church ............... F04D 29/4213 |
| | | 415/119 |
| 2003/0000507 A1* | 1/2003 | Kobayashi ............. F02B 37/16 |
| | | 123/568.21 |
| 2006/0021346 A1* | 2/2006 | Whelan ............... F02B 29/0406 |
| | | 60/605.2 |

FOREIGN PATENT DOCUMENTS

| CN | 1963165 A | 5/2007 |
| CN | 103097689 A | 5/2013 |
| CN | 203847726 U | 9/2014 |
| CN | 104389677 A | 3/2015 |
| CN | 104975956 A | 10/2015 |

* cited by examiner

*Primary Examiner* — Brandon Lee
(74) *Attorney, Agent, or Firm* — Quinn IP Law

(57) ABSTRACT

A gas compressor assembly configured to pressurize an airflow received from the ambient for delivery to an internal combustion engine having a cylinder includes a compressor housing. A compressor wheel is disposed inside the compressor housing and configured to pressurize the airflow. A compressor bypass is configured to direct the pressurized airflow away from the cylinder. A pressure relief valve is configured to selectively open and close the compressor bypass to thereby limit pressure of the pressurized airflow and minimize surge of the compressor wheel. A baffle arranged inside the compressor bypass is configured to dissipate energy of a sound wave generated by the pressurized airflow upon an initial opening of the pressure relief valve. An internal combustion engine employing such a turbocharger is also disclosed.

18 Claims, 5 Drawing Sheets

GAS COMPRESSOR PRESSURE RELIEF NOISE REDUCTION

TECHNICAL FIELD

The present disclosure relates to a device for reducing noise generated during pressure relief in a gas compressor.

BACKGROUND

Internal combustion engines (ICE) are often called upon to generate considerable levels of power for prolonged periods of time on a dependable basis. Many such ICE assemblies employ supercharging or gas compressor assemblies to compress the airflow before it enters the combustion chambers of the engine in order to increase power and efficiency. Such supercharging assemblies can be driven mechanically, electrically, or via an exhaust gas generated by the engine.

Typically, central to such a supercharging assembly is a compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

Frequently, such supercharging assemblies also employ pressure relief valves, a.k.a., bypass or blowoff valves, arranged aft of the compressor to release excess pressure from the engine's intake tract and prevent compressor surge. By preventing surge, a pressure relief valve reduces wear on the gas compressor assembly and the engine. Specifically, such valves relieve the damaging effects of compressor "surge loading" by allowing the compressed air, in the case of blowoff valves, to vent to the atmosphere or, in the case of compressor bypass valves, to recirculate into the intake tract upstream of the compressor inlet.

SUMMARY

One embodiment of the disclosure is directed to a gas compressor assembly configured to pressurize an airflow received from the ambient for delivery to an internal combustion engine. The gas compressor includes a compressor housing. The gas compressor also includes a compressor wheel disposed inside the compressor housing and configured to pressurize the airflow. The gas compressor additionally includes a compressor bypass configured to direct the pressurized airflow away from the engine's cylinder. A pressure relief valve is configured to selectively open and close the compressor bypass to thereby limit pressure of the pressurized airflow and minimize surge of the compressor wheel. A baffle arranged inside the compressor bypass is configured to dissipate energy of a sound wave and limit an acoustic spike generated by the pressurized airflow upon an initial opening of the pressure relief valve.

The baffle can be configured as a sleeve-ring and may be configured to fit around the pressure relief valve.

The sleeve-ring can define at least one aperture configured to pass the pressurized airflow.

The at least one aperture may include a plurality of apertures. In a cross-sectional plane, the sleeve-ring can have a shape configured to maximize a surface area of the sleeve-ring to thereby accommodate the plurality of apertures.

The sleeve-ring shape and the plurality of apertures together can be configured to dissipate energy of the sound wave generated by the pressurized airflow upon the initial opening of the pressure relief valve.

The pressure relief valve can include a feature, and the baffle can be retained by the feature.

Alternatively, the baffle can be retained relative to the compressor housing via one of a snap-ring and a weld.

The baffle can be formed from one of steel, aluminum, and a high-temperature, i.e., temperature-resistant plastic material.

The gas compressor assembly can additionally include an intake tract. The compressor bypass can be configured to direct the pressurized airflow into the intake tract.

The compressor bypass can be configured to direct the pressurized airflow to the ambient.

The engine can include a reciprocating piston disposed inside the cylinder and a combustion chamber defined therebetween. The piston can be configured to exhaust post-combustion gases from the combustion chamber, and the gas compressor assembly can be configured as a turbocharger driven by the post-combustion gases.

Another embodiment of the present disclosure is directed to an internal combustion engine having the gas compressor as described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
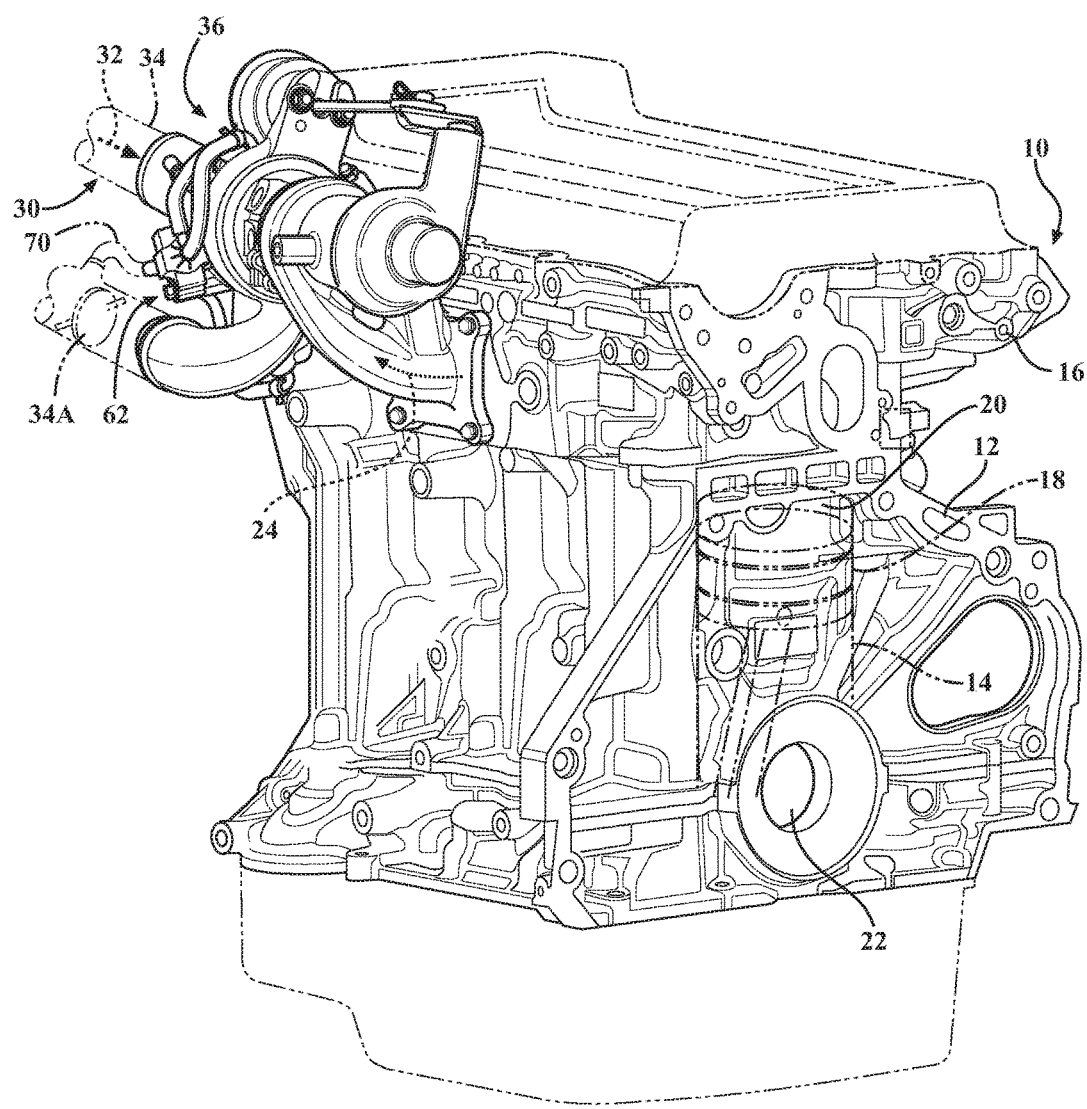
FIG. 1 is a schematic perspective view of an engine with a gas compressor configured as an exhaust gas driven turbocharger according to an embodiment of the disclosure.

Referring to the drawings wherein like reference numbers correspond to like or similar components throughout the several figures, FIG. 1 illustrates an internal combustion engine 10. The engine 10 also includes a cylinder block 12 with a plurality of cylinders 14 arranged therein. As shown in FIG. 1, the engine 10 may also include a cylinder head 16 that is mounted on the cylinder block 12. Each cylinder 14 includes a piston 18 configured to reciprocate therein.

Combustion chambers 20 are formed within the cylinders 14 between the bottom surface of the cylinder head 16 and the tops of the pistons 18. As known by those skilled in the art, each of the combustion chambers 20 receives fuel and air from the cylinder head 16 that form a fuel-air mixture for subsequent combustion inside the subject combustion chamber. The cylinder head 16 is also configured to exhaust post-combustion gases from the combustion chambers 20. The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 24 from the respective cylinder 14.

The engine 10 additionally includes an induction system 30 configured to channel an airflow 32 from the ambient to the cylinders 14. The induction system 30 includes an intake tract or air duct 34, a gas compressor assembly 36, and may include an intake manifold (not shown). Although not shown, the induction system 30 may additionally include an air filter upstream of the gas compressor assembly 36 for removing foreign particles and other airborne debris from the airflow 32. The intake air duct 34 is configured to channel the airflow 32 from the ambient to the gas compressor assembly 36, while the gas compressor assembly is configured to pressurize the received airflow, and discharge the pressurized airflow to the combustion chambers 20, such as via the intake manifold. The intake manifold may in turn distribute the previously pressurized airflow 32A to the cylinders 14 for mixing with an appropriate amount of fuel and subsequent combustion of the resultant fuel-air mixture.

According the disclosure, the gas compressor assembly 36 may be configured as a turbocharger driven by post-combustion gases 24. Alternatively, the gas compressor assembly 36 may be configured as an electrically or mechanically driven supercharger. Although neither embodiment of the foregoing supercharger is shown, such an electrically driven supercharger can be operated by an electric motor, while a mechanically driven supercharger can be operatively connected to a crankshaft 22 of the engine 10. Although each of the supercharger and turbocharger embodiments of the gas compressor assembly 36 is envisioned by the present disclosure, for conciseness and clarity, the remainder of the description will focus on the turbocharger embodiment of the gas compressor assembly, and will be designated as the turbocharger 36.

Figure 2:
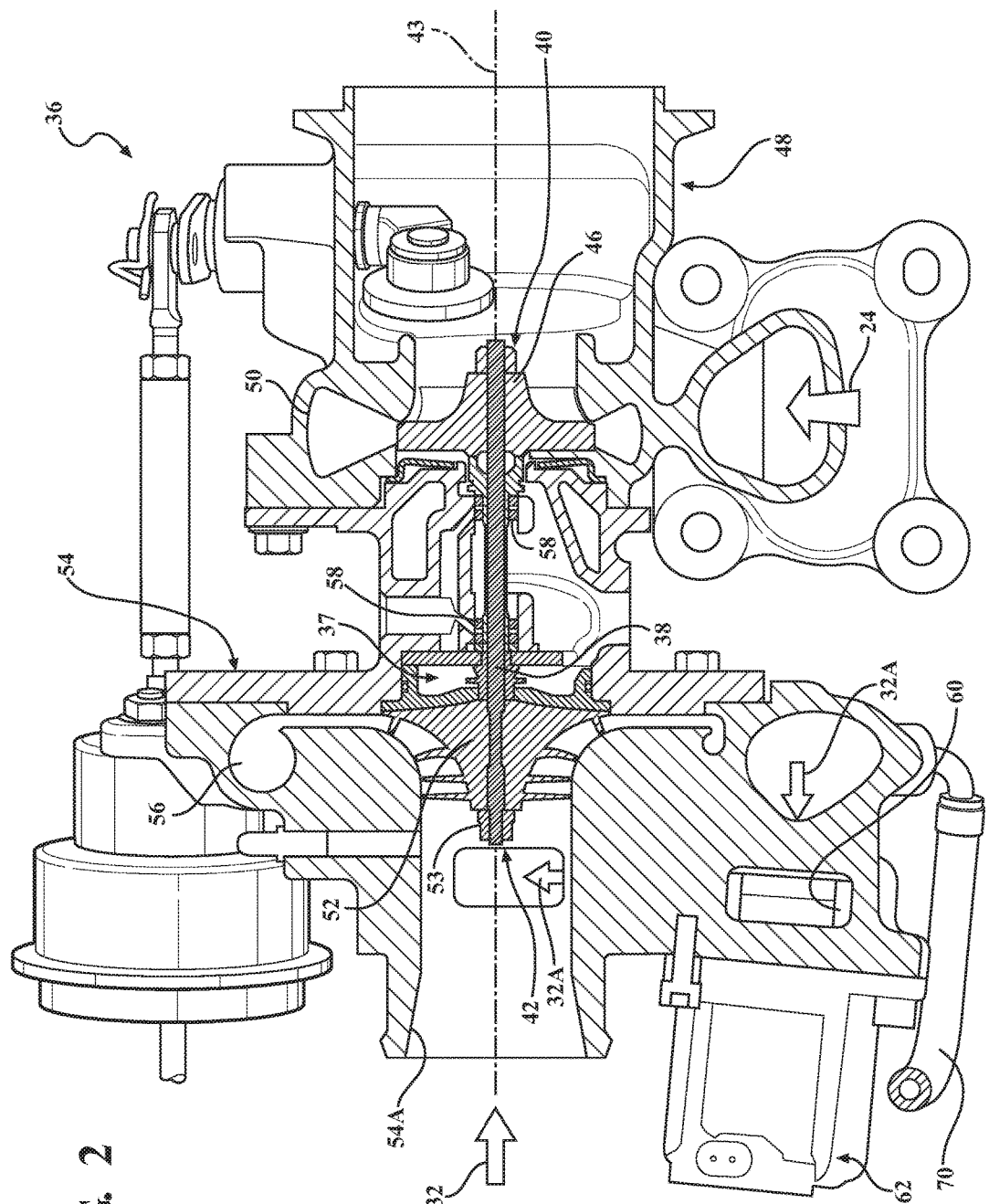
FIG. 2 is a schematic perspective partial cross-sectional view of the turbocharger shown in FIG. 1, showing a compressor housing and a pressure relief valve arranged to control a compressor bypass.

As shown in FIG. 2, the turbocharger 36 includes a rotating assembly 37. The rotating assembly 37 includes a shaft 38 having a first end 40 and a second end 42. The rotating assembly 37 also includes a turbine wheel 46 mounted on the shaft 38 proximate to the first end 40 and configured to be rotated along with the shaft 38 about an axis 43 by post-combustion gases 24 emitted from the cylinders 14. The turbine wheel 46 is typically formed from a temperature and oxidation resistant material, such as a nickel-chromium-based "inconel" super-alloy to reliably withstand temperatures of the post-combustion gases 24, which in some engines may approach 2,000 degrees Fahrenheit. The turbine wheel 46 is disposed inside a turbine housing 48 that includes a turbine volute or scroll 50. The turbine scroll 50 receives the post-combustion exhaust gases 24 and directs the exhaust gases to the turbine wheel 46. The turbine scroll 50 is configured to achieve specific performance characteristics, such as efficiency and response, of the turbocharger 36.

As further shown in FIG. 2, the rotating assembly 37 also includes a compressor wheel 52 mounted on the shaft 38 between the first and second ends 40, 42. The compressor wheel 52 is retained on the shaft 38 via a specially configured fastener 53. The compressor wheel 52 is configured to pressurize the airflow 32 being received from the ambient for eventual delivery to the cylinders 14. The compressor wheel 52 is disposed inside a compressor housing 54 that includes a compressor volute or scroll 56. The compressor scroll 56 receives the airflow 32 at a compressor housing inlet 54A and directs the airflow to the compressor wheel 52. The compressor scroll 56 is configured to achieve specific performance characteristics, such as peak airflow and efficiency of the turbocharger 36. Accordingly, rotation is imparted to the shaft 38 by the post-combustion exhaust gases 24 energizing the turbine wheel 46, and is in turn communicated to the compressor wheel 52 owing to the compressor wheel being fixed on the shaft.

The rotating assembly 37 is supported for rotation about the axis 43 via journal bearings 58. During operation of the turbocharger 36, the rotating assembly 37 may frequently operate at speeds over 100,000 revolutions per minute (RPM) while generating boost pressure for the engine 10. As understood by those skilled in the art, the variable flow and force of the post-combustion exhaust gases 24 influences the amount of boost pressure that may be generated by the compressor wheel 52 throughout the operating range of the engine 10.

Figure 3:
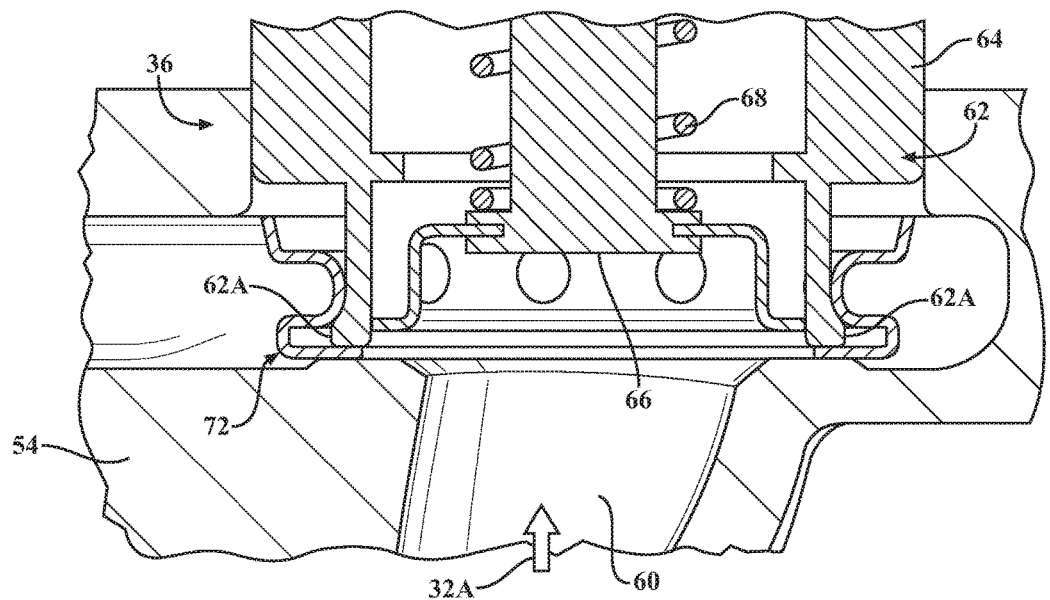
FIG. 3 is a schematic close-up cross-sectional view of the turbocharger shown in FIGS. 1 and 2, showing the compressor bypass including a baffle according to an embodiment of the disclosure being closed by the pressure relief valve.

With resumed reference to both FIGS. 2 and 3, the turbocharger 36 includes a compressor bypass 60, which is configured as a fluid passage defined by the compressor housing 54 to direct the pressurized airflow 32A away from the combustion chambers 20. The turbocharger 36 also includes a pressure relief valve 62 arranged aft or downstream of the compressor wheel 52 and configured to selectively open and close the compressor bypass 60. As shown, the pressure relief valve 62 can be mounted to the compressor housing 54. The pressure relief valve 62 is configured, i.e., constructed and positioned, to prevent surge of the compressor wheel 52. Specifically, the pressure relief valve 62 is intended to relieve the damaging effects of compressor "surge loading" by preventing the pressurized airflow 32A that cannot be received within the combustion chambers 20 from backing up into the compressor wheel 52, and instead be rerouted and vented to a low pressure area.

The pressure relief valve 62 can be configured to recirculate the pressurized airflow 32A from the compressor bypass 60 into the intake tract 34 upstream of the compressor housing inlet 54A. In the embodiment where the pressurized airflow 32A is recirculated from the compressor bypass 60 into the intake tract 34, the pressure relief valve 62 is known as a "bypass" valve. The pressure relief valve 62 can also be configured to release excess pressure to the ambient from the engine's intake manifold (not shown). In the embodiment where the pressurized airflow 32A is recirculated from the intake manifold to the ambient, the pressure relief valve 62 is known as a "blow-off" valve. By preventing surge, the pressure relief valve 62 reduces wear on the gas compressor assembly, and in the particular case, the turbocharger 36, as well as the engine 10.

As shown, generally the pressure relief valve 62 includes a valve housing 64 and a piston 66 configured to shift therein. The piston 66 can be preloaded in the valve housing 64 by a spring 68. As shown in FIG. 1, the pressure relief valve 62 is typically connected by a vacuum hose 70 to the engine's intake manifold downstream of a throttle 34A. Alternatively, although not shown, the pressure relief valve 62 can be connected by the vacuum hose 70 to the intake tract 34 upstream of the turbocharger 36. When the throttle 34A is closed, the relative pressure in the intake tract 34 drops below atmospheric pressure and the resulting pressure differential operates the piston 66 inside the valve housing 64. The excess pressure from the turbocharger 36 is then vented into the atmosphere or recirculated into the intake tract 34 upstream of the compressor housing inlet 54A. When the throttle 34A is open, the air pressure on both sides of the piston 66 is equal and the spring 68 keeps the piston down. When the throttle 34A is closed, a vacuum forms in the intake tract 34 upstream of the turbocharger 36. The combination of a closed throttle 34A with the pressurized airflow 32A from the turbocharger 36 moves the piston 66 in the pressure relief valve 62 to open the compressor bypass 60 and release excess pressure by rerouting the pressurized airflow 32A into the compressor housing inlet 54A or the atmosphere. The pressure relief valve 62 can also be controlled and operated electronically, such as via an electrically actuated solenoid (not shown).

The turbocharger 36 also includes a baffle 72 arranged inside the compressor bypass 60. When the piston 66 of the pressure relief valve 62 is initially opened to counter surge of the compressor wheel 52, a sudden pressure rise accompanied by an acoustic spike can be generated by an initial opening of the pressure relief valve 62. The baffle 72 is configured, i.e., constructed and positioned, to dissipate energy of a pressure wave generated by the pressurized airflow 32A upon the initial opening of the pressure relief valve 62. As a result of dissipation of energy of the pressure wave inside the compressor bypass 60, an acoustic spike resulting from such sudden pressure rise upon the initial opening of the pressure relief valve 62 can be attenuated. The baffle 72 can be configured as a sleeve-ring 72A, as specifically shown in FIGS. 3-8, and may be constructed to fit around the pressure relief valve 62. The baffle 72 can be formed either from steel, aluminum, temperature-resistant plastic, or any other tough and rigid material capable of withstanding temperatures around 150 degrees Celsius.

Figure 5:
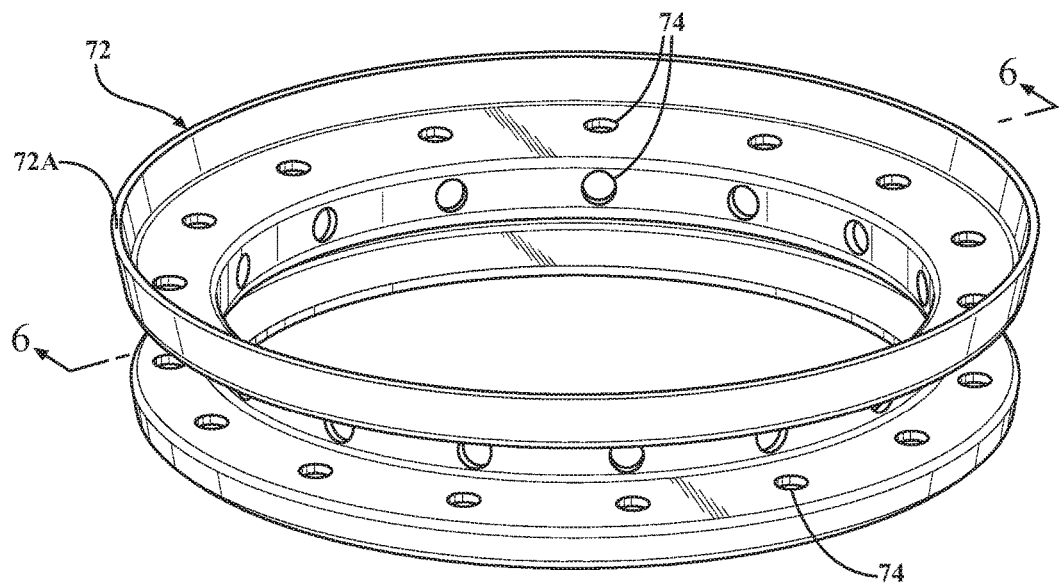
FIG. 5 is a close-up perspective view of the baffle shown in FIGS. 3-4.
Figure 6:
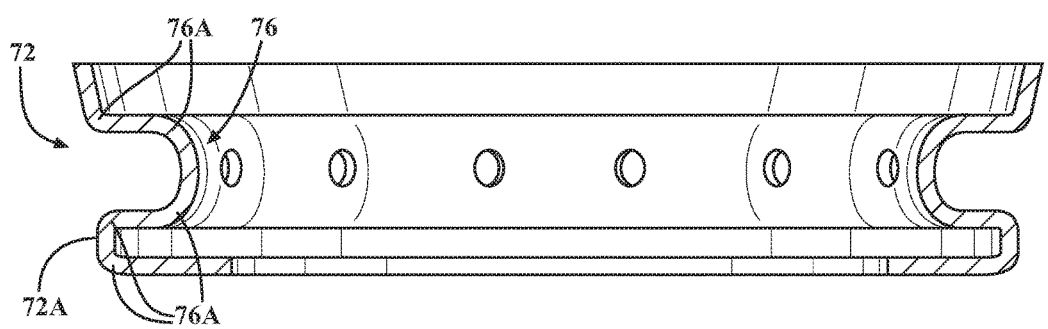
FIG. 6 is a schematic close-up cross-sectional side view of the baffle shown in FIGS. 3-5.

As shown in FIGS. 5 and 6, the sleeve-ring 72A defines at least one aperture 74 configured to pass the pressurized airflow 32A. The baffle 72 can includes a plurality of apertures 74 arranged strategically around the sleeve-ring 72A. As shown, the apertures can be arranged on the sleeve-ring 72A such that some of the apertures 74 are oriented perpendicular to some of the other apertures. As additionally shown in FIG. 6, in a cross-sectional plane 6-6, the sleeve-ring 72A can have a shape 76 that includes a plurality of bends 76A configured to maximize a surface area of the sleeve-ring and thereby accommodate and maximize the plurality of apertures 74. In the specific embodiment shown, the shape 76 includes five bends 76A, but the number of bends can be smaller or greater depending on the specific performance characteristics and operating requirements of the particular gas compressor 36.

As can be seen in FIGS. 3-8, the sleeve-ring 72A is arranged in the compressor bypass 60 downstream of the pressure relief valve 62 such that the pressurized airflow 32A is diffused through the apertures 74 for dissipating energy of the sound wave generated by the pressurized airflow 32A. Accordingly, the shape 76 of the sleeve-ring 72A and the plurality of apertures 74 can function together as a system to dissipate energy of the sound wave generated by the pressurized airflow 32A upon the initial opening of the pressure relief valve 62. The baffle 72 can also have other shapes, such as the shape of a dish (not shown), where a portion of the baffle is arranged in the compressor bypass 60 upstream of the pressure relief valve 62, while another portion is arranged downstream of the pressure relief valve. Such a dish shape could include at least some apertures 74 and a plurality of bends 76A for the same purpose as the sleeve-ring 72A.

Figure 4:
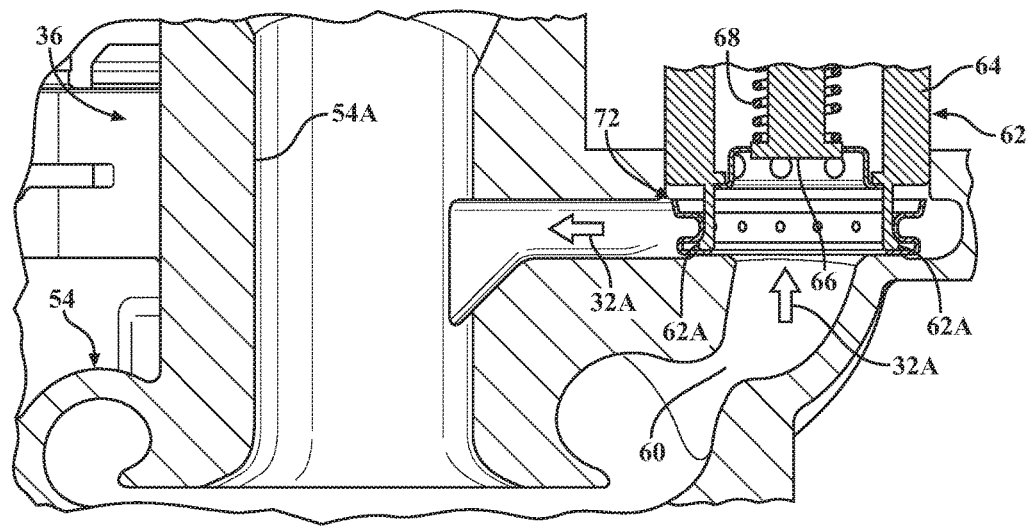
FIG. 4 is a schematic close-up cross-sectional view of the turbocharger shown in FIG. 3, showing the compressor bypass including the baffle being opened by the pressure relief valve.
Figure 7:
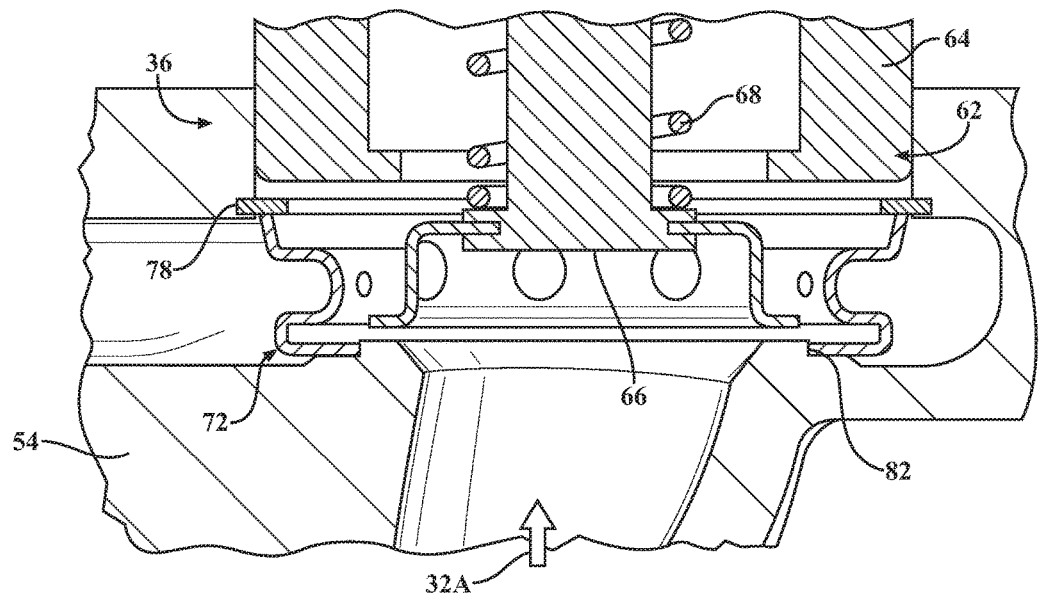
FIG. 7 is a schematic close-up cross-sectional view of the turbocharger shown in FIGS. 1 and 2, showing the compressor bypass including a baffle according to another embodiment of the disclosure being closed by the pressure relief valve.
Figure 8:
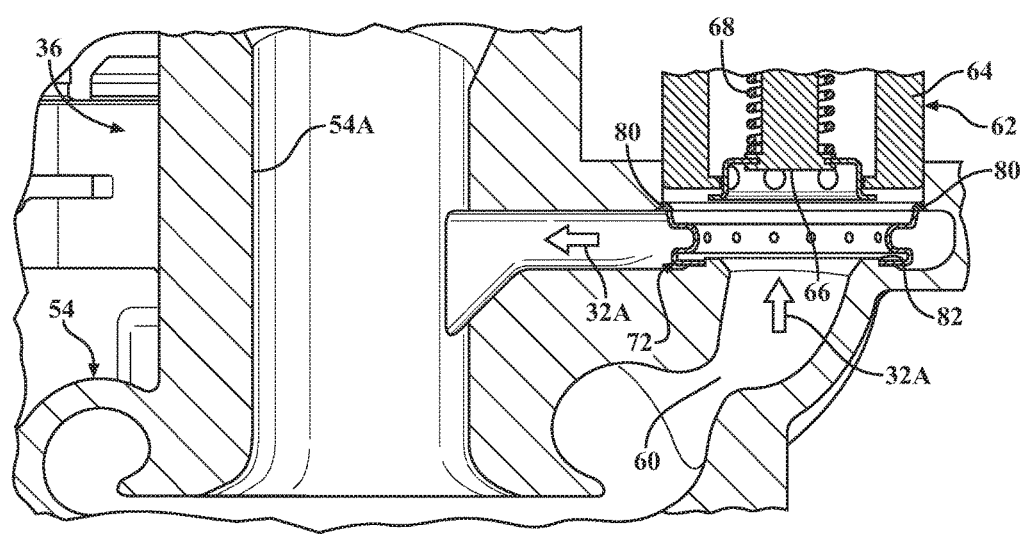
FIG. 8 is a schematic close-up cross-sectional view of the turbocharger shown in FIG. 7, showing the compressor bypass including the baffle being opened by the pressure relief valve.

As shown in FIGS. 3-4, the pressure relief valve 62 can include a feature 62A. The feature 62A can be mechanically fixed to the valve housing 64 or be integrally formed therewith. The baffle 72, whether having the sleeve-ring 72A shape or any other embodiment thereof, can be retained by the feature 62A. The feature 62A can be configured as one or more projections configured to engage and fix the baffle 74 once the baffle is arranged inside the bypass 60. Specifically, the baffle 72 can be retained by the feature 62A when both the pressure relief valve 62 and the baffle are installed in the compressor bypass 60, such that the pressure relief valve can be assembled into the bypass simultaneously with the baffle. Alternatively, the baffle 72 can be installed in the compressor bypass 60 prior to installation of the pressure relief valve 62. In such an embodiment, the baffle 72 can be retained relative to the compressor housing 54 either via a snap-ring 78 (shown in FIG. 7) or a weld 80 (shown in FIG. 8). In any of the above described embodiments, the baffle 72 is assembled into the compressor housing 54 to ensure its proper positioning and orientation relative to the pressure relief valve 62 within the particular gas compressor assembly 36. For example, as shown in FIGS. 7 and 8, the baffle 72 can be located on a specially configured centering feature 82 formed or machined in the compressor housing 54.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An internal combustion engine comprising:
   a cylinder configured to receive an air-fuel mixture for combustion therein;
   a reciprocating piston disposed inside the cylinder; and
   a gas compressor assembly configured to pressurize an airflow being received from an ambient and deliver the pressurized airflow to the cylinder, the gas compressor assembly including:
   a compressor housing;
   a compressor wheel disposed inside the compressor housing and configured to pressurize the airflow;

a compressor bypass configured to direct the pressurized airflow away from the cylinder;

a pressure relief valve configured to selectively open and close the compressor bypass to thereby limit pressure of the pressurized airflow and minimize surge of the compressor wheel; and a baffle arranged inside the compressor bypass and configured to dissipate energy of a sound wave generated by the pressurized airflow upon an initial opening of the pressure relief valve;

wherein:
the baffle is configured as a sleeve-ring defining a plurality of apertures configured to pass the pressurized airflow;
the plurality of apertures includes at least one aperture oriented perpendicular to at least one other aperture; and
in a cross-sectional plane, the sleeve-ring has a shape including a plurality of bends configured to maximize a surface area of the sleeve-ring to thereby accommodate the plurality of apertures.

2. The engine of claim 1, wherein the sleeve-ring shape and the plurality of apertures are together configured to dissipate enginery of the sound wave generated by the pressurized airflow upon the initial opening of the pressure relief valve.

3. The engine of claim 1, wherein the pressure relief valve includes a feature configured to retain the baffle.

4. The engine of claim 1, wherein the baffle is retained relative to the compressor housing via one of a snap-ring and a weld.

5. The engine of claim 1, wherein the baffle is formed from one of steel, aluminum, and a temperature-resistant plastic material.

6. The engine of claim 1, further comprising an intake tract, wherein the compressor bypass is configured to direct the pressurized airflow into the intake tract.

7. The engine of claim 1, wherein the plurality of bends includes five bends.

8. The engine of claim 3, wherein the pressure relief valve includes a valve housing and a piston configured to shift therein, and wherein the feature configured to retain the baffle is one of mechanically fixed to the valve housing and integrally formed therewith.

9. The engine of claim 8, wherein the feature is configured as one or more projections configured to engage and fix the baffle when the baffle is arranged inside the compressor bypass.

10. A gas compressor assembly configured to pressurize an airflow received from an ambient for delivery to an internal combustion engine having a combustion chamber, the gas compressor assembly comprising:

a compressor housing;

a compressor wheel disposed inside the compressor housing and configured to pressurize the airflow;

a compressor bypass configured to direct the pressurized airflow away from the combustion chamber;

a pressure relief valve configured to selectively open and close the compressor bypass to thereby limit pressure of the pressurized airflow and minimize surge of the compressor wheel; and a baffle arranged inside the compressor bypass and configured to dissipate energy of a sound wave generated by the pressurized airflow upon an initial opening of the pressure relief valve;

wherein:
the baffle is configured as a sleeve-ring defining a plurality of apertures configured to pass the pressurized airflow;
the plurality of apertures includes at least one aperture oriented perpendicular to at least one other aperture; and
in a cross-sectional plane, the sleeve-ring has a shape including a plurality of bends configured to maximize a surface area of the sleeve-ring to thereby accommodate the plurality of apertures.

11. The gas compressor assembly of claim 10, wherein the sleeve-ring shape and the plurality of apertures are together configured to dissipate enginery of the sound wave generated by the pressurized airflow upon the initial opening of the pressure relief valve.

12. The gas compressor assembly of claim 10, wherein the pressure relief valve includes a feature configured to retain the baffle.

13. The gas compressor assembly of claim 10, wherein the baffle is retained relative to the compressor housing via one of a snap-ring and a weld.

14. The gas compressor assembly of claim 10, wherein the baffle is formed from one of steel, aluminum, and a temperature-resistant plastic material.

15. The gas compressor assembly of claim 10, further comprising an intake tract, wherein the compressor bypass is configured to direct the pressurized airflow into the intake tract.

16. The gas compressor assembly of claim 10, wherein the plurality of bends includes five bends.

17. The gas compressor assembly of claim 12, wherein the pressure relief valve includes a valve housing and a piston configured to shift therein, and wherein the feature configured to retain the baffle is one of mechanically fixed to the valve housing and integrally formed therewith.

18. The gas compressor assembly of claim 17, wherein the feature is configured as one or more projections configured to engage and fix the baffle when the baffle is arranged inside the compressor bypass.

* * * * *